United States Patent [19]

Frantz

[11] 4,199,331
[45] Apr. 22, 1980

[54] DUAL FILTER ASSEMBLY FOR COMPRESSED GAS

[75] Inventor: Virgil L. Frantz, Salem, Va.

[73] Assignee: Graham-White Sales Corp., Salem, Va.

[21] Appl. No.: 918,719

[22] Filed: Jun. 26, 1978

[51] Int. Cl.² .......................................... B01D 53/04
[52] U.S. Cl. ...................................... 55/161; 55/179; 55/387; 55/463
[58] Field of Search ................ 55/32, 33, 62, 74, 179, 55/387, 463, DIG. 17, 160, 161–163

[56] References Cited

U.S. PATENT DOCUMENTS

| | | | |
|---|---|---|---|
| 825,796 | 7/1906 | Bartlett et al. | 55/DIG. 17 X |
| 2,790,505 | 4/1957 | Dow | 55/179 X |
| 3,192,686 | 7/1965 | Berkey et al. | 55/DIG. 17 X |
| 3,323,291 | 6/1967 | Kern | 55/179 X |
| 3,884,655 | 5/1975 | Coop | 55/463 X |
| 4,113,451 | 9/1978 | Frantz | 55/389 X |

Primary Examiner—Charles N. Hart
Assistant Examiner—Richard W. Burks
Attorney, Agent, or Firm—Wilmer Mechlin

[57] ABSTRACT

A compressed gas filter assembly having dual filter units each containing an adsorbent and alternating between filtering and regenerating cycles, the units alternately receiving compressed gas from a source for adsorbing a contaminant therefrom and having the adsorbent regenerated by reverse flow therethrough of filtered gas from the other unit and together providing an uninterrupted output of filtered gas from the assembly, and a regenerating line connecting filtered gas outlets of the units and having in each unit a restricted orifice centered on and directed toward a downstream end of a canister therein containing the adsorbent, each orifice alternately passing a metered flow of filtered gas under substantially constant pressure to the other unit and discharging filtered gas from the other unit as a substantially constant flow of gas at reduced pressure for regenerating and cooling the adsorbent in its unit. A conical deflector mounted centrally on a foraminous end plate at the downstream end of the canister, spreads the regenerating gas across the adsorbent and protects the end plate from damage by any particulate matter discharged from the orifice with the gas.

6 Claims, 3 Drawing Figures

REGENERATING        UNFILTERED GAS        FILTERING

DUAL FILTER ASSEMBLY FOR COMPRESSED GAS

BACKGROUND OF THE INVENTION

As pointed out in my copending application Ser. No. 804,733, filed June 8, 1977, now U.S. Pat. No. 4,113,415, patented Sept. 9, 1978, an assembly of adsorbent-containing, alternately filtering dual filter units individually alternating between filtering and regenerating cycles, can dispense with drawing filtered gas for reverse-flow regenerating of the adsorbent from a purge tank or other compressed gas reservoir and use instead for the regenerating, part of the filtered gas from the filtering unit. The assembly disclosed in that application diverts part of the filtered gas from the filtering unit for regenerating the adsorbent in the other unit through piping connecting the filtered gas outlets of the two units and having in each unit a check valve for passing gas freely therefrom and a restricted orifice for discharging thereinto filtered gas from the other unit. As disclosed in Kreuter U.S. Pat. No. 3,324,631, the prior art had also recognized that possibility of utilizing part of the filtered air output of one of a pair of adsorbent-containing filter units for cyclically regenerating the adsorbent in the other filter unit by connecting the filtered air outlets of the two units through a passage restricted intermediate its ends by a single variable restrictor common to both units. In the Frantz application, the purpose of the restricted orifice in each unit is, by discharging the regenerating gas onto the downstream end of the adsorbent and at the same time restricting the discharge, to cause the gas to expand and consequently cool on issuing from the restricted orifice and thus both cool and regenerate the adsorbent. As opposed, the only purpose apparent from the Kreuter patent in the variable restrictor in the regenerating gas passage between the filtered gas outlets of the two units is to regulate the portion of the filtered gas output of the filtering unit diverted for regenerating the adsorbent in the other unit. It is to an improvement on the regenerating gas connection of filtered gas outlets of dual filter units that the present invention is particularly directed.

SUMMARY OF THE INVENTION

The primary object of the present invention is to provide an improved compressed gas filter assembly having alternately filtering dual filters, wherein filtered gas outlets of the units are connected by a regenerating gas line having in each end in each unit a restricted orifice for passing filtered regenerating gas from and to that unit.

Another object of the invention is to provide a dual filter assembly of the character described in the preceding object, wherein the restricted orifice in each unit is substantially centered on and directed toward a downstream end of the adsorbent in that unit.

A further object of the invention is to provide an improved compressed gas filter assembly having alternately filtering filter units each containing a particulate adsorbent in a canister having a foraminous downstream end, wherein filtered gas outlets of the units are connected by a regenerating gas line having in each end in each unit a restricted orifice for passing regenerating gas from and to the unit, the orifice in each unit is directed toward and substantially centered on the downstream end of the adsorbent-containing canister therein, and a conical deflector in each unit centered on and directed toward the orifice therein and covering a central portion of the canister's foraminous downstream end, both protects that portion and spreads regenerating gas discharged from the orifice over the adsorbent.

Other objects and advantages of the invention will appear hereinafter in a detailed description, be particularly pointed out in the appended claims and be illustrated in the accompanying drawings, in which:

FIGURE DESCRIPTION

DETAILED DESCRIPTION

Referring now in detail to the drawings in which like referenced characters designate like parts, the compressed gas dual filter assembly of the present invention is adapted for use in installations requiring an uninterrupted output of filtered compressed gas, such as the compressed air system of a diesel locomotive.

As exemplary of the invention, the preferred assembly, designated as 1, has been illustrated as identical with the Compressed Gas Filter Assembly of my copending application Ser. No. 804,733, filed Aug. 8, 1977, except for the manner in which dual filter units are connected for passing filtered regenerating gas therebetween. Since that application is now allowed and, with the exception of the regenerating gas connection, describes and discloses the illustrated assembly in detail, only so much of the assembly will now be described as necessary for an understanding of the present invention.

Figure 1:
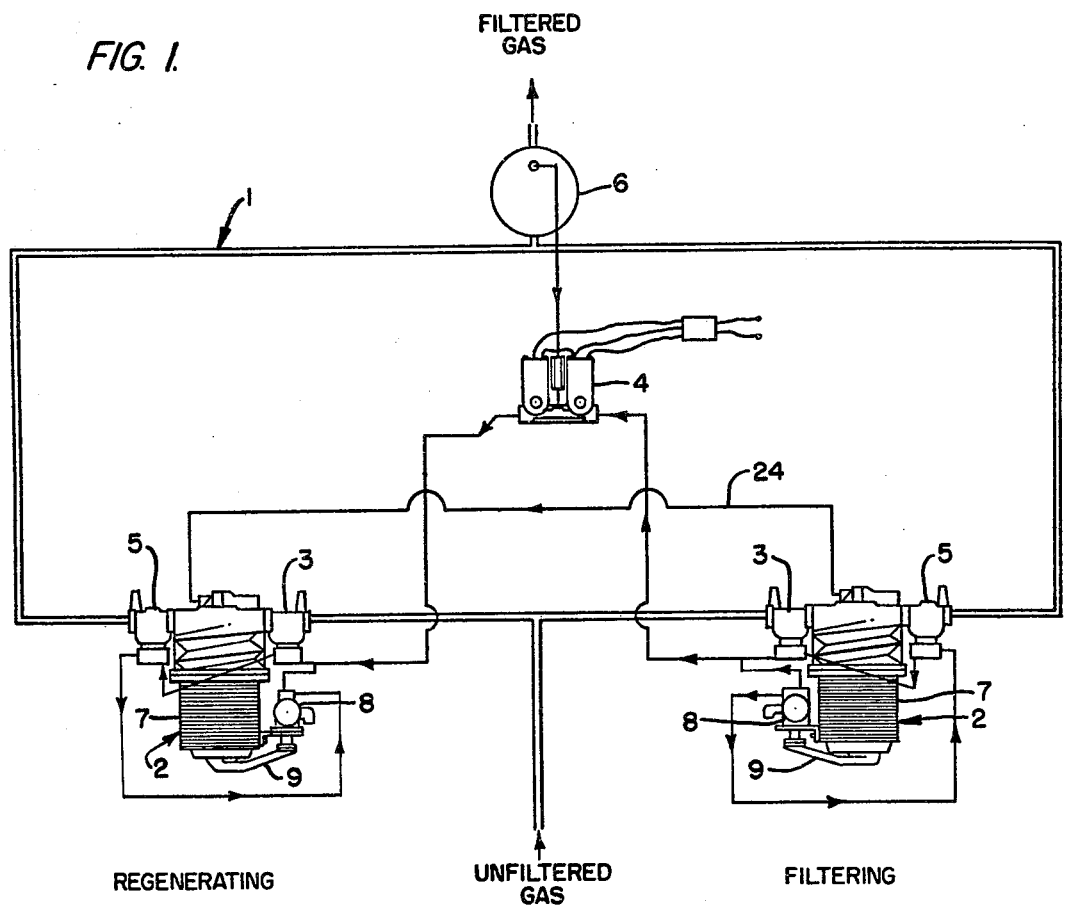
FIG. 1 is a schematic view of a preferred embodiment of the compressed gas filter assembly of the present invention.
Figure 3:
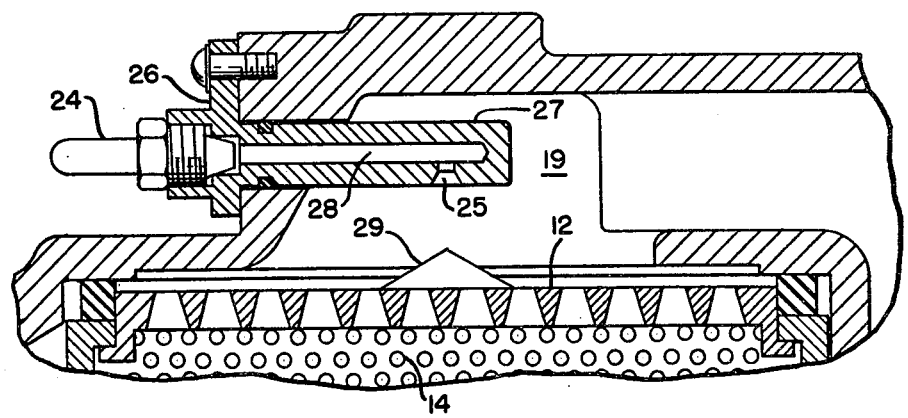
FIG. 3 is a fragmentary enlargement on the section of FIG. 2 of the top portion of the filter unit of that figure.

As shown schematically in FIG. 1, the preferred assembly 1 is comprised of dual or a pair of filter units 2 alternately connected through inlet valves 3 to a source (not shown) of unfiltered compressed gas and individually alternating between filtering and regenerating cycles, both under a suitable control, such as the illustrated solenoid-actuated control valve 4. Each filter unit 2 has an outlet valve 5 through which its output of filtered compressed gas is passed for the intended end use, either directly or through a common final fine dust or like filter 6. With a housing 7 mounting its inlet and outlet valves 3 and 5, each of the units 2 also mounts on the housing a drain valve 8, connected to the bottom of the housing, preferably through a drain pipe 9 heatable under thermostatic control for protecting any contained liquid from freezing.

During the filtering cycle of each of the units 2, its inlet and outlet valves 3 and 5 are both open and the drain valve 8 closed, while the reverse relation obtains in the unit's regenerating cycle, the inlet and outlet valves then both being closed and the drain valve open, the latter for draining or exhausting the bottom of the housing 7 to atmosphere. As in my copending application, the inlet and outlet valves 3 and 5 preferably are pneumatically opened and closed check valves with, as their valve elements, differential pistons 10 alternately closed by the pressure of actuating gas from the control valve 4 when connected thereto and opened by the pressure from the source of the unfiltered gas. By contrast, the drain valve 8 of each unit is spring-closed and opened by the pressure of actuating gas from the control valve 4. Thus, by alternately supplying actuating gas to the filter units 2 in cycles of predetermined duration, the control valve 4 causes one of the units to be in its filtering cycle while the other is in its regenerating cycle and vice versa.

Figure 2:
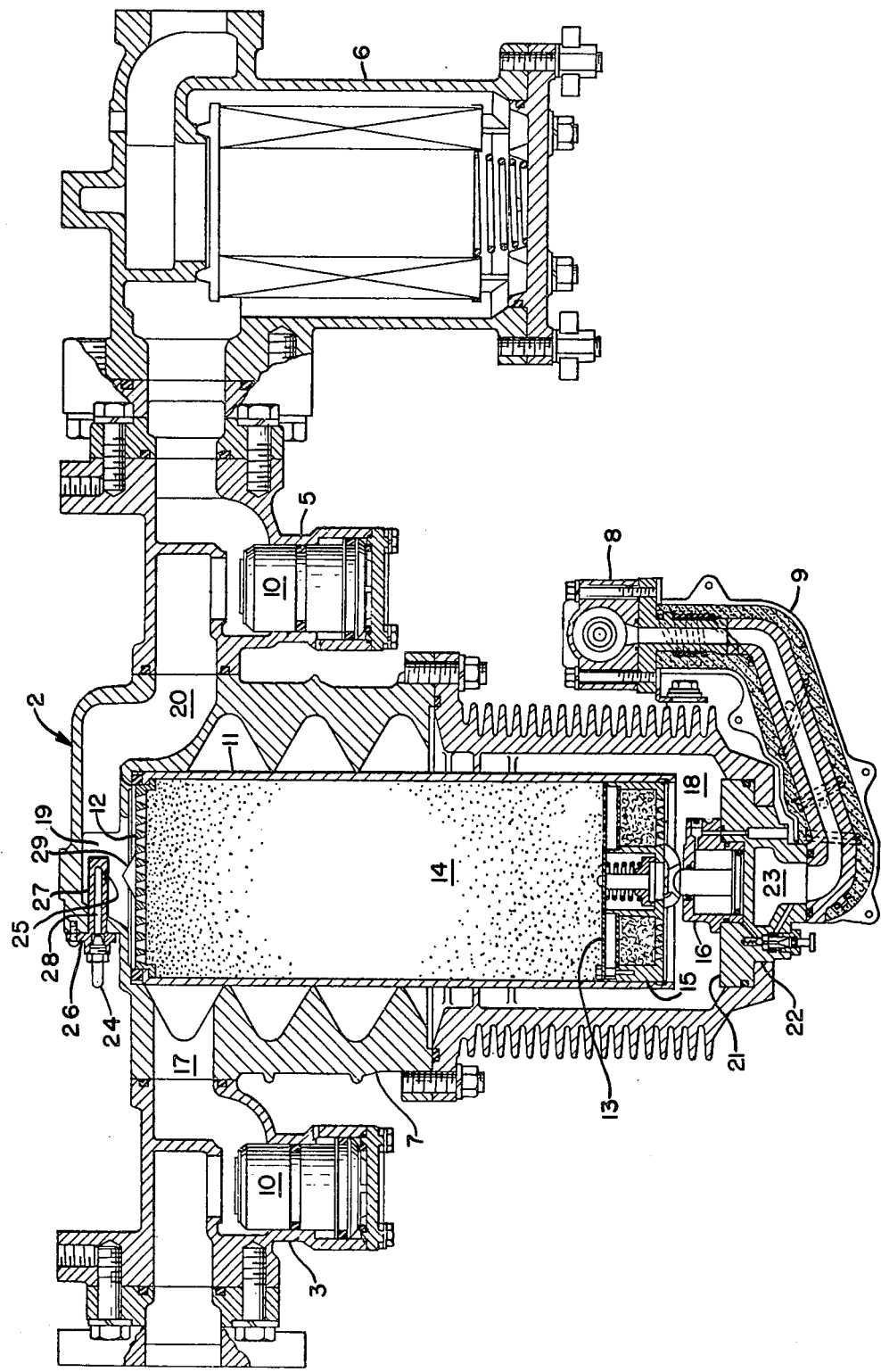
FIG. 2 is a vertical sectional view on an enlarged scale of one of the filter units and the final filter of the assembly of FIG. 1.

As shown in FIG. 2, the housing 7 of each filter unit 2 houses or contains a suitably vertically disposed cylindrical canister 11 having a foraminous upper or downstream end or end plate 12 and filled, containing or confining between that end and a lower or upstream foraminous plate 13, a bed or column of a particulate or fine particle adsorbent or adsorbing dessicant 14, preferably, for its superior adsorption efficiency, a fine bead or particle molecular sieve. Below the bed of adsorbent 14, the illustrated canister 11 contains an oil-trapping scrubber 15 acting additionally as a floating follower for enabling a bottom-acting compactor 16, actuated by fluid pressure in the housing, to maintain the adsorbent beads or particles compacted or tightly packed.

In a filtering cycle of either of the filter units 2, unfiltered or dirty compressed gas enters the housing 7 from the then open inlet valve 3 through an inlet port 17. Flowing from the inlet port downwardly around the canister 11 and in process being cooled and having entrained contaminants separated therefrom by both condensation and centrifugal action, the compressed gas undergoing filtering, on reaching a sump 18 in the bottom of the housing 7, is reversed in direction for upward flow in the canister 11 through the scrubber 15 and adsorbent 14 for respectively trapping oil and like particles and, in an exothermic reaction selectively adsorbing the contaminant, usually moisture, for which the adsorbent is suited. Leaving the canister 11 through the latter's foraminous downstream end 12, the now filtered compressed gas flows into an outlet passage 19 leading in sequence to an outlet port 20 of the housing and the outlet valve 5. Any contaminants separated from the compressed gas as it flows around the canister 11, are collected in the sump 18 and passed therefrom through openings (not shown) between circumferentially spaced, radially projecting arms 21 of the base 22 mounting the compactor 16, to the housing's drain port 23 for discharge therefrom through the drain pipe 9 and drain valve 8 during the filter unit's regenerating cycle.

As is now the usual practice in the case of adsorbent-containing filter units, previously filtered compressed gas is used in the assembly 1 of the present invention for reverse flow regeneration of the adsorbent, in which the filtered regenerating gas entrains or collects from the adsorbent the contaminant adsorbed thereby, before being exhausted, discharged or drained to atmosphere through the then open drain valve 8. As does the filter assembly of my copending application Ser. No. 804,733, the assembly 1 avoids drawing the filtered regenerating gas from a reservoir by connecting the filtered gas outlets or outlet passages 19 of the filter units 2 by a regenerating gas line or piping 24 for diverting part of the output of filtered gas from the then filtering unit to the other unit for regenerating the adsorbent therein. Also, as in my copending application, the regenerating gas is discharged from the regenerating line 24 into the unit being regenerated through a restricted orifice 25 directed, here downwardly, at and centered on the downstream end 12 of the canister 11 and therethrough the adsorbent 14, for expanding the regenerating gas to both increase its capacity for the moisture or other contaminant adsorbed by the adsorbent and cool the adsorbent for countering or dissipating the heat engendered in the adsorbent by its exothermic reaction in adsorbing the contaminant during the previous filtering cycle of the filter unit.

Alike in the foregoing respects and also in depending on a substantially constant pressure in the regenerating gas line for driving the expanded regenerating gas from the restricted orifice, here 25, at a substantially constant flow rate through the filter unit being regenerated, with consequent uniformity in the efficiency of the regenerating action of the gas on the adsorbent, the assemblies of this and my copending application differ radically in the way in which the substantially constant pressure in the regenerating line 24 is obtained. On the premise that the pressure in the regenerating line 24 otherwise would be too low to be effective, in my copending application regenerating gas is admitted or enters the regenerating line through a check valve. However, I have now discovered that, with the restricted orifices 25 at or in both ends of the regenerating line 24, the check valves of the copending application can be dispensed with and the regenerating gas both admitted to or received by and discharged from the regenerating line in either of the filter units 2 through the restricted orifice therein. The discovery was occasioned by finding that, as a result of the restriction imposed on expansion of the regenerating gas within the regenerating line 24 between the restricted orifices 25 both by the small bore or diameter of the regenerating line and the back pressure from the restricted orifice at the line's then outlet end, the drop in pressure across the restricted orifice at the line's then inlet end was too small or inconsequential to prevent maintenance in the line between the orifices of a sufficient constant pressure to drive the expanded regenerating gas discharged or released from the line at the desired substantially constant flow rate through the filter unit being regenerated. Thus, for an output pressure in the filtering unit on the order of about 120 to 140 p.s.i.g. (8.436 to 9.842 Kg./sq.cm.g.), the drop across the restricted orifice at the inlet end of the regenerating line was only about 10 to 15 p.s.i.g. (0.703 to 1.054 Kg./sq.cm.g.) and correspondingly lower for lower output pressures.

As illustrated, the regenerating line 24 preferably has as each of its end portions an end fitting 26 mounted on a side of the top portion of the housing 7 opposite the outlet port 20 and coupled to the adjoining end of the intermediate part of the regenerating line. Each of the preferred end fittings has a general tubular body or portion 27, extending with suitable sealing through the intervening wall of the housing 7 and projecting into the outlet passage 19 above and beyond the center of the upper or downstream end 12 of the canister 11. Axially bored, suitably to the same inside diameter as the intermediate part of the regenerating line, the fitting's tubular portion 27 has as a side opening onto its bore 28 one of the restricted orifices 25, conveniently formed as a countersunk radial drilling, and, inwardly beyond the restricted orifice, has a solid or otherwise closed inner end closing the corresponding end of the bore. With the restricted orifice 25 centered on and directed toward the foraminous downstream end 12 of the canister 11, the regenerating gas discharged from the orifice during a regenerating cycle of the related filter unit 2, despite expanding as it leaves the orifice, will tend to concentrate on the central portion of the foraminous end and can even wear away that portion, if, despite compaction of the particulate adsorbent 14, the regenerating gas contains fine dust particles produced by interabrasion of the adsorbent beads and picked up or entrained in the gas passing through the adsorbent in the other unit. Consequently, both to protect the central portion of the foraminous end 12 from abrasion and to spread the gas across the adjoining end portion of the bed of adsorbent 14, there preferably is interposed between that end and the restricted orifice 25 a suitably cone-shaped or conical deflector 29 having its base mounted or supported on and covering the central portion of the canister end and centered on the orifice with its apex pointing theretoward.

With the filter units 2 under control of the control valve 4 alternately filtering the supplied unfiltered compressed gas for producing an uninterrupted output of filtered gas and each unit alternating between filtering and regenerating cycles, the direct connection of the filtered gas outlets of the filter units by the regenerating gas line 24 having as its only openings in the units the restricted orifices 25, effectively meters by the orifice at or in its then inlet end the part of the filtered gas output diverted for regenerating the adsorbent 14 in the other unit and with only a minimal pressure drop across the orifice as the entering gas passes therethrough. Holding or maintaining in the regenerating line 24 between the orifices a substantially constant pressure almost as high as or closely approaching the pressure in the filtering unit, the regenerating gas, throughout a regenerating cycle, is able to be driven under a correspondingly constant force through the restricted orifice at the then outlet end of the line. The inside diameter of the canister 11 in the filter unit 2 being regenerated is much greater than that of the regenerating line 24, and, with the bottom of that unit open to atmosphere through its then open drain valve 8, there is no back pressure opposing entry of the regenerating gas. Thus entering a contained space of relatively large volume and low pressure, the regenerating gas in the unit being regenerated, is free to expand and reduce in pressure and, under the substantially constant driving force, will flow as low pressure gas through the adsorbent at a substantially constant flow rate, with consequent uniformity in the efficiency of the regenerating action of the gas on the adsorbent. Cooling as it expands and directed toward the adjoining end 12 of the canister 11 rather than a part of the housing 7, the cooling action of the regenerating gas is not dissipated on the housing and, instead, is available for counteracting or dissipating the heat engendered in the adsorbent during the preceding filtering cycle by its exothermic reaction with the moisture or other contaminant it adsorbs.

From the above detailed description it will be apparent that there has been provided an improved dual filter assembly for compressed gas wherein a direct connection between the filtered gas outputs of the filter units is availed of for diverting part of the filtered gas from a filter unit in its filtering cycle to regenerate an adsorbent in the other unit and the connection to each unit for flow of regenerating gas therefrom and thereto is through the same restricted orifice. It should be understood that the described and disclosed embodiment is merely exemplary of the invention and all modifications are intended to be included that do not depart from the spirit of the invention and the scope of the appended claims.

Having now described my invention, I claim:

1. A dual filter assembly for compressed gas, comprising a pair of filter units alternately receiving and filtering compressed gas from a source thereof, each of said units containing an adsorbent and alternating between filtering and regenerating cycles for respectively adsorbing a contaminant from said gas by said absorbant and regenerating said adsorbent, and a regenerating gas line connecting filtered gas outlets of said units, said regenerating gas line having an end portion projecting into each unit with a restricted orifice in each end portion for passing filtered gas from and to said unit respectively during filtering and regenerating cycles thereof.

2. A dual filter assembly according to claim 1, wherein the restricted orifice in the regenerating unit discharges filtered compressed gas received in the regenerating gas line through the restricted orifice in the filtering filter unit as expanding regenerating gas into the regenerating unit, and the restricted orifices cooperate to maintain the compressed gas in the line between the orifices at a substantially constant pressure approaching the pressure in the filtering filter unit for driving the regenerating gas through the regenerating unit under a substantially constant force throughout the regenerating cycle thereof.

3. A dual filter assembly according to claim 2, wherein in each filter unit the adsorbent is a bed of particulate adsorbent, and the restricted orifice is centered on and positioned to direct filtered gas discharged therefrom onto a presented outlet end of the adsorbent bed for enabling said gas to both cool and regenerate the adsorbent.

4. A dual filter assembly according to claim 3, wherein each filter unit includes deflector means interposed between the restricted orifice therein and the outlet end of the adsorbent bed for spreading the regenerating gas discharged from the orifice over the outlet end of the adsorbent bed.

5. A dual filter assembly according to claim 4, wherein each filter unit includes a housing having as the filtered gas outlet an outlet passage, a canister in said housing containing the bed of adsorbent, said canister having a foraminous upper end opening onto said outlet passage and confining the outlet end of the adsorbent bed, the restricted orifice in said unit is centered on said foraminous outlet end, and the deflector means is a conical deflector having a base supported on said canister outlet end and an apex directed toward and centered on the restricted orifice.

6. A dual filter assembly according to claim 1, wherein the restricted orifice in each filter unit in a filtering cycle thereof meters the part of the filtered gas output of the unit diverted to the regenerating line and in a regenerating cycle of the unit discharges gas from the line into the unit as expanded regenerating gas.

* * * * *